United States Patent [19]

Stuck et al.

[11] Patent Number: 5,588,354
[45] Date of Patent: Dec. 31, 1996

[54] APPARATUS FOR CONVEYORIZED GRIDDLE-LIKE COOKING OF FOOD PRODUCTS

[75] Inventors: Robert M. Stuck, Lake Wylie, S.C.; James Rapier, III, Charlotte, N.C.

[73] Assignee: Marshall Air Systems, Inc., Charlotte, N.C.

[21] Appl. No.: 531,709

[22] Filed: Sep. 21, 1995

[51] Int. Cl.$^6$ .............................. A23L 1/00; A47J 37/00; A47J 37/04
[52] U.S. Cl. .................. 99/386; 99/349; 99/400; 99/423; 99/443 C; 99/446; 99/477
[58] Field of Search .................. 99/386, 443 C, 99/360, 362, 389, 423, 390, 349, 404, 400, 420, 401, 427, 446, 373, 477, 339, 443 R; 198/637, 678.1, 680; 219/388, 411; 426/233, 523, 644, 518; 452/149, 188

[56] References Cited

U.S. PATENT DOCUMENTS

| | | |
|---|---|---|
| Re. 32,994 | 7/1989 | Adamson et al. . |
| 635,588 | 10/1899 | Pondorf . |
| 1,492,112 | 4/1924 | Watrous . |
| 2,776,034 | 1/1957 | Jordt . |
| 3,980,174 | 9/1976 | Conrad . |
| 4,008,801 | 2/1977 | Reilly et al. . |
| 4,027,139 | 5/1977 | Theimer . |
| 4,072,092 | 2/1978 | Kohli et al. .......................... 99/389 |
| 4,197,792 | 4/1980 | Mendoza .......................... 99/349 |
| 4,530,276 | 7/1985 | Miller . |
| 4,586,428 | 5/1986 | Adamson . |
| 4,587,948 | 5/1986 | Haglund . |
| 4,609,090 | 9/1986 | McIlvaine et al. . |
| 4,667,589 | 5/1987 | Bishop . |
| 4,878,424 | 11/1989 | Adamson . |
| 4,924,767 | 5/1990 | Stuck . |
| 5,006,355 | 4/1991 | Stuck et al. . |
| 5,013,563 | 5/1991 | Stuck . |
| 5,044,264 | 9/1991 | Forney .......................... 99/349 |
| 5,086,694 | 2/1992 | Stuck et al. . |
| 5,133,248 | 7/1992 | Farnsworth et al. . |
| 5,176,068 | 1/1993 | Stuck et al. . |
| 5,206,045 | 4/1993 | Stuck . |
| 5,213,322 | 5/1993 | Matsuo et al. . |
| 5,336,512 | 8/1994 | Stuck et al. . |
| 5,458,051 | 10/1995 | Alden et al. .......................... 99/349 |

*Primary Examiner*—Timothy F. Simone
*Attorney, Agent, or Firm*—Shefte, Pinckney & Sawyer

[57] ABSTRACT

An apparatus for conveyorized griddle-like cooking of food products simultaneously on two opposed product sides comprises a pair of cooking elements arranged in opposed spaced facing relation to emit thermal cooking energy toward one another and two endless food transport conveyors driven to travel between the cooking elements along respective food-conveying runs in a common transport direction in sufficient closely spaced, generally parallel relation to transport the food products to be cooked simultaneously on opposite sides. Each conveyor is preferably in the form of a belt having a substantially continuous imperforate food contacting surface so as to provide griddle-like contact with the opposite sides of the food product during cooking. Differing embodiments of the apparatus are contemplated to accommodate cooking of differing food products, e.g., with horizontally disposed conveyor belts for food products such as Mexican quesadillas and like foods which do not render grease or juices or with inclined conveyor belts to provide for drainage of renderings when cooking such products.

12 Claims, 10 Drawing Sheets

APPARATUS FOR CONVEYORIZED GRIDDLE-LIKE COOKING OF FOOD PRODUCTS

BACKGROUND OF THE INVENTION

The present invention relates generally to apparatus for cooking foods on an automated basis utilizing a conveyor arrangement for transporting foods through a heated cooking area and, more particularly, relates to a novel apparatus by which food products may be cooked on a conveyorized basis simultaneously on two opposed sides of the food product in a griddle-like manner.

Conventional efforts toward the development of improved food preparation techniques in the food service industry, especially in regard to the so-called "fast-food" restaurant business, have been directed increasingly toward the continual reduction of the time required to prepare and subsequently cook a food item, the ultimate objective in many cases being to prepare and cook each individual item upon a customer's order as opposed to serving customers items cooked in advance. Equal concern naturally is given to the need during times of peak demand to maximize the capacity of a fast-food restaurant for preparing and cooking food products in large volumes within a short time period. In turn, as production increases, the ancillary concern for ensuring uniformity in the quality of food preparation and cooking becomes even more acute than under normal conditions.

One means of addressing these various concerns has been to develop conveyorized apparatus for the automated cooking of food products, with the goal of increasing production capacity and assuring uniformity in quality with minimal need for supervision by a skilled cook or chef. As a result, a wide variety of various conveyorized cooking apparatus has been developed over recent years, each typically designed for a relatively specific form of cooking particular types of food products. Representative examples of such conveyorized cooking equipment are described in U.S. Pat. Nos. 4,530,276; 4,667,589; 4,924,767 (see also related U.S. Pat. No. 5,013,563); 5,006,355; 5,086,694; 5,176,068; 5,206,045; and 5,336,512.

One type of food cooking machine which, however, has not generally been considered susceptible of fabrication in a conveyorized form is a conventional griddle. Commercial-type griddles typically are fabricated of a basic structure, sometimes referred to as a "clamshell" design, having a stationary horizontal food support surface, typically in the form of a flat continuous planar metal sheet, with a generally coextensive heating element (e.g., an electrically energized platen) situated immediately beneath the cooking surface, and a pivoted lid having a similarly planar continuous cooking surface with a cooking element situated immediately behind the surface, for pivoting movement into and out of covering relation to the stationary horizontal food support surface. In this manner, a wide range of various food products may be simultaneously cooked by direct application of heat simultaneously to two opposite sides of the product by closing the lid onto the food product when situated on the stationary support surface. Essentially any form of food product of a configuration presenting two generally flat opposite outward sides (e.g., ranging from hamburgers to sandwiches to Mexican quesadillas) may be cooked on such a griddle apparatus.

While commercial griddles of the aforementioned type function quite suitably for their intended purposes, and indeed are commonly viewed as being the apparatus of choice for cooking some types of food products (e.g., griddled cheese sandwiches and Mexican quesadillas), several disadvantages exist. First, the capacity of such griddles is necessarily limited to the dimensional area of the stationary food support surface and, hence, during periods of peak demand in a restaurant setting, average customer service times are typically increased. Also, the cooking of food on such griddles must be closely monitored by an attendant to ensure that each food product is removed as soon as fully cooked so as to prevent overcooking or even burning. Periodic cleaning of the stationary and pivoting griddle surfaces is necessary when preparing products which render grease or other juices or may tend to ooze or seep (such as cheese-containing products).

SUMMARY OF THE INVENTION

It is accordingly a fundamental object of the present invention to provide a conveyorized apparatus which will perform the equivalent of a griddle-type contact cooking of food products on an automated basis, so as to thereby overcome the various disadvantages of conventional griddles.

Briefly summarized, the present invention accomplishes the foregoing objectives by providing an apparatus having a pair of cooking elements arranged in generally parallel spaced facing relation so as to emit thermal cooking energy toward one another, in conjunction with two endless food transport conveyors driven to travel between the cooking elements along respective food-conveying runs in a common transport direction in sufficiently closely spaced, generally parallel relation to transport a food product between the conveyors and between the cooking elements by contact with opposite sides of the food product. According to the present invention, each of the conveyors has a substantially continuous imperforate food contacting surface, preferably in the form of an endless belt, in order to provide a griddle-like contact by the conveyors with the respective sides of the food product so as to achieve a griddle-like cooking of the product simultaneously on both sides. Preferably, each conveyor belt comprises a substrate web coated with a polymeric outer layer, such as tetrafluoroethylene, to form the continuous imperforate food contacting surface while providing anti-stick qualities and ease of cleaning the belts.

In the preferred embodiment, each conveyor belt is trained about a pair of supporting rollers, with a drive motor connected in synchronous driving relation to one roller of each pair. Various embodiments of this basic drive arrangement are possible. For example, in one embodiment, one support roller for each conveyor belt may carry a fixed drive gear which meshes with an endless drive chain driven by the motor. In an alternative embodiment, the respective drive gears for the rollers may be arranged in meshing engagement with one another, with the drive motor having a driving gear meshing with one of the roller gears.

It is also considered preferable to provide means for easy removal and replacement of the conveyor belts when necessary. According to one possible embodiment, the non-driven supporting roller for each conveyor belt may be mounted for selective movement toward and away from the driven roller to allow for easy exchange of the conveyor belts. In an alternative embodiment, each conveyor belt and its associated supporting rollers may be assembled as a unit which may be slidably installed into and removed from the cooking apparatus.

The present apparatus also preferably provides means by which the conveyor belts are maintained in proper alignment relative to the supporting rollers. For this purpose, each conveyor is preferably formed with an endless tracking rib extending along the length of the conveyor and at least one of the associated supporting rollers is formed with an annular groove in which the rib is continuously received.

Means may also be provided in some embodiments of the apparatus to enable selective adjustment of the spacing between the food-conveying runs of the conveyors, in order to enable the apparatus to accept differing types of food products having varying thicknesses. In some embodiments, it will be deemed advantageous to orient the food-conveying runs of the conveyor to be substantially horizontal, e.g., when cooking foods which do not tend to render grease or juices. Alternatively, in other embodiments it will be advantageous to orient the food-conveying runs to be inclined from horizontal sufficiently for drainage of liquids rendered during cooking.

DETAILED DESCRIPTION OF THE PREFERRED EMBODIMENTS

Figure 1:
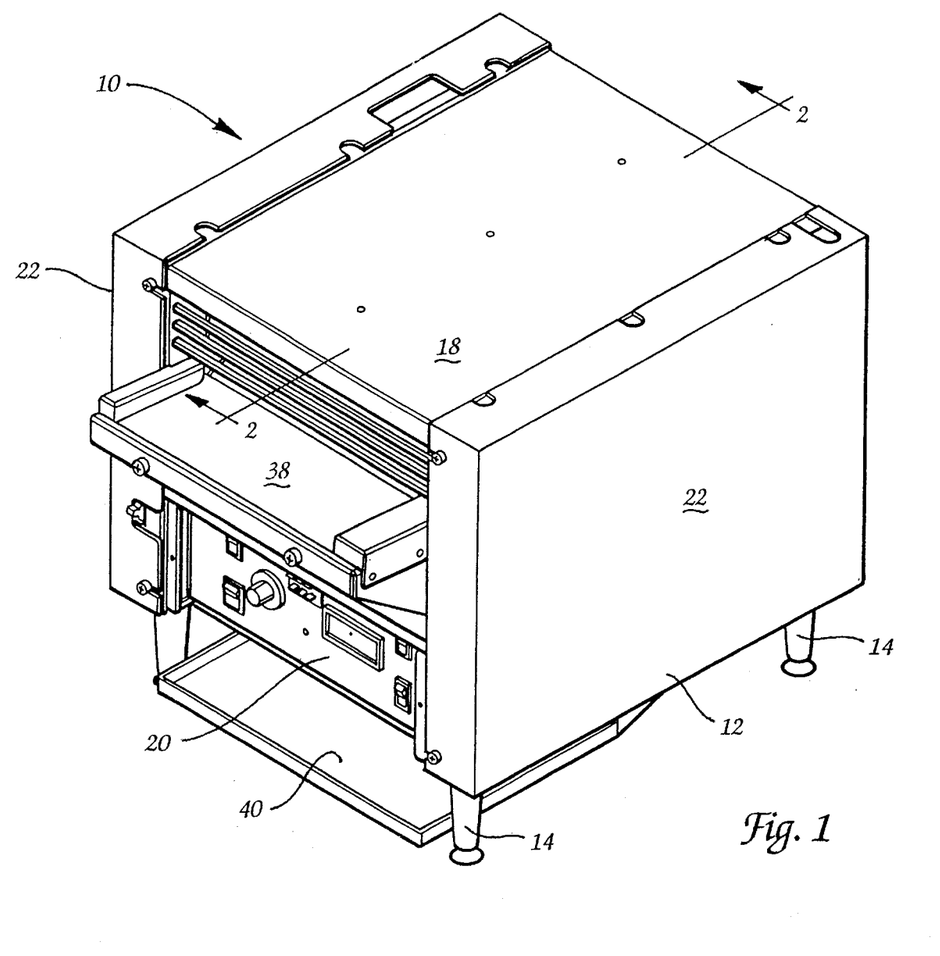
FIG. 1 is a perspective view of a conveyorized griddle apparatus according to one embodiment of the present invention.
Figure 2:
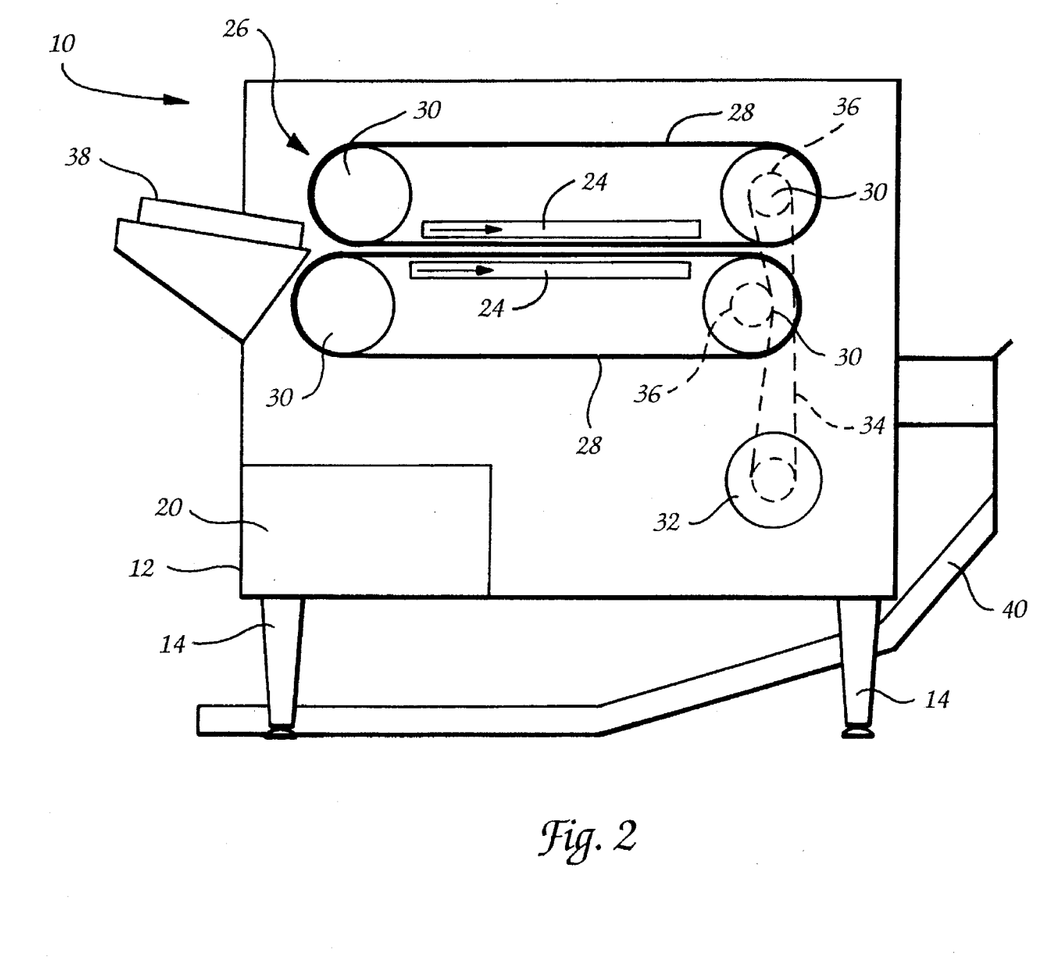
FIG. 2 is a lengthwise vertical cross-sectional view taken through the griddle apparatus of FIG. 1 along line 2-2 thereof.

Referring now to the accompanying drawings and initially to FIGS. 1 and 2, one contemplated embodiment of a conveyorized griddle-like cooking apparatus in accordance with the present invention is indicated generally at 10. The griddle apparatus 10 basically comprises an upstanding rectangular frame 12 mounted at its lower corners on four support legs 14. The frame 12 has two main upright frame plates 16 (FIGS. 3 and 4) supported vertically in spaced parallel relation by horizontal upper and lower transverse frame plates 18, the lower frame plate 18 supporting a control unit 20 for the apparatus 10. Outer panels 22 protectively enclose the frame 12 and the operational components (described more fully hereinafter) mounted thereto.

A pair of cooking elements 24, preferably in the form of planar electrical resistance heating units such as described in U.S. Pat. No. 4,924,767, are mounted to the frame 12 between the upright frame plates 16 horizontally in opposing spaced facing relation to one another so as to define therebetween a cooking zone wherein the cooking elements 24 emit thermal cooking energy toward one another. A food transport conveyor arrangement, generally represented in its totality at 26, is similarly supported by the frame 12 between the vertical frame plates 16 adjacent the upper side of the frame 12 to transport food products to be cooked along a horizontal path of travel between the cooking elements 24 while maintaining contact with opposed upper and lower sides of the food product to achieve a griddle-like cooking thereof simultaneously on both product sides.

As best seen in FIG. 2, the conveyor arrangement 26 basically comprises a pair of endless conveyor belts 28 each trained about a pair of support rollers 30 spaced horizontally from one another at the opposite lengthwise ends of a respective one of the cooking elements 24. In this manner, each conveyor belt 28 follows a path of travel essentially encircling a respective one of the cooking elements 24 whereby the two conveyor belts 28 have respective operating runs extending in closely spaced parallel relation between the cooking elements 24.

The frame 12 also supports a drive motor 32 which drives an endless chain 34 trained in meshing engagement with drive sprockets 36 mounted coaxially to one roller 30 of each roller pair (see FIG. 4), thereby to drive the two conveyor belts 28 in opposite directions so that their respective operating runs between the cooking elements 24 move in a common food transporting direction from the front side of the apparatus 10 to its rear side, as basically represented in FIG. 2. A feed shelf 38 is mounted horizontally across the front side of the frame 12 to assist in delivering food products into the nip area between the forwardmost ends of the two conveyor belts 28. Similarly, a discharge tray 40 is mounted horizontally across the rear side of the frame 12 immediately adjacent the rearward end of the conveyor arrangement 26 to receive food products exiting from between the conveyor belts 28, the discharge tray 40 extending downwardly and forwardly beneath the frame 12 to return the cooked food products to the forward side of the apparatus 10. In this manner, an operator can feed food products into the apparatus 10 and remove cooked food products from the apparatus 10 from the same forward side of the apparatus.

In accordance with the present invention, the belts 28 present a solid imperforate foodcontacting surface which is continuous both lengthwise along and widthwise across each belt, thereby to maintain continuous surface contact with food products during transport between the cooking elements 24 in substantially identical manner to the opposed surfaces of conventional griddles as described above. It is contemplated that a variety of differing types of belts formed of diverse materials and constructions may be utilized in the apparatus 10, but it is considered to be important that the belts be sufficiently flexible to bend in precise conformity to the support rollers yet have a sufficiently low overall modulus of elasticity to resist any significant elongation over extended periods of use. Further, it is considered equally important that the belts 28 be substantially liquid-impervious so as to not absorb or otherwise collect grease or juices rendered from the food products during cooking nor to otherwise become soiled by the food products. One type of belt which has been determined to provide these desirable characteristics and to otherwise perform suitably in the apparatus 10 is a belt having a woven textile web formed of fiberglass yarns as a belt substrate and impregnated with a suitable polymeric material to provide a flat, substantially smooth, continuous imperforate surface to the belt. The most preferred such polymeric material is tetrafluoroethylene, one form of which is produced under the trademark TEFLON, which advantageously provides the additional characteristic of resisting any tendency of the food product to stick to the belts.

Figure 3:
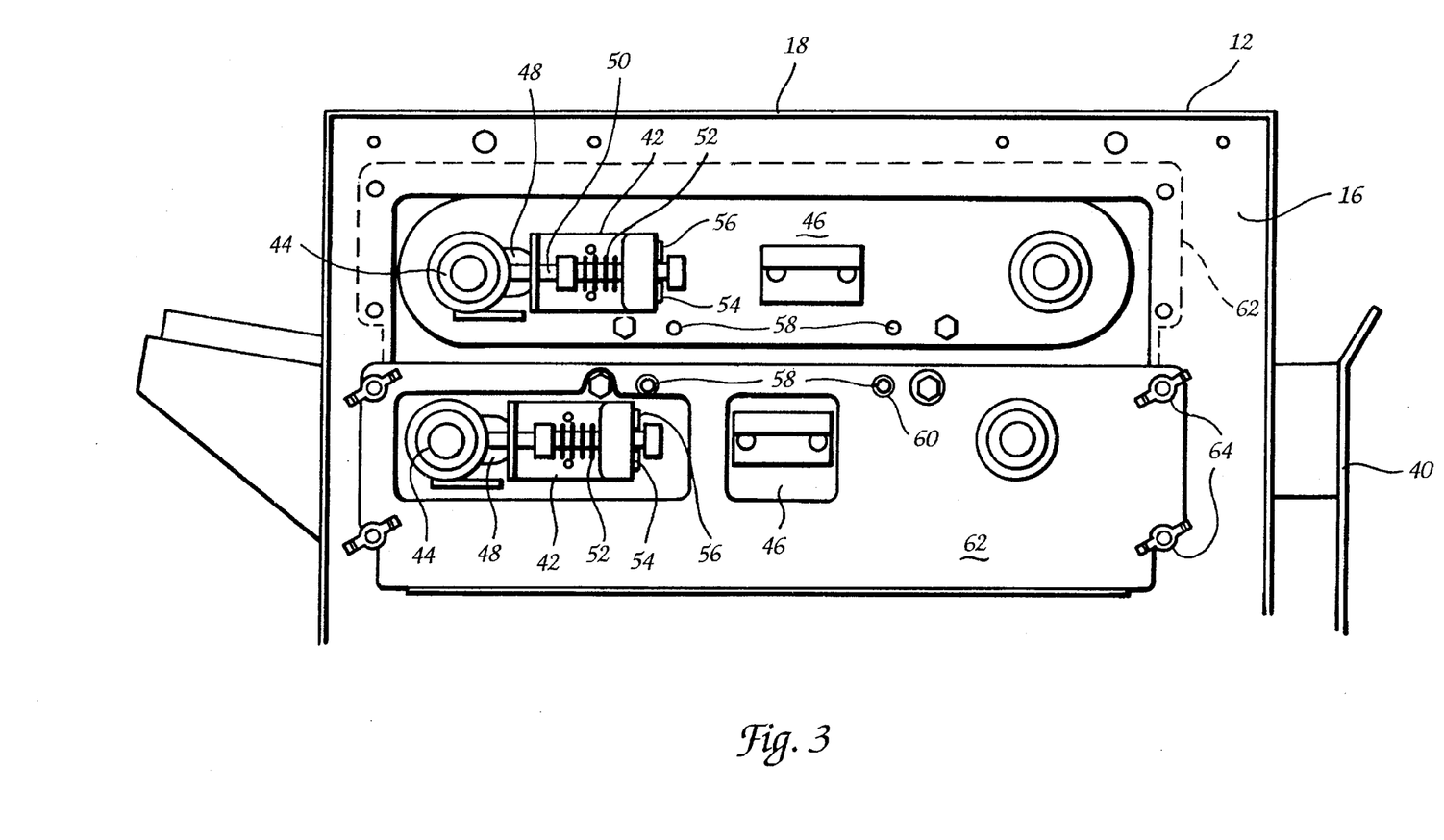
FIG. 3 is a partial right side elevational view of the griddle apparatus of FIGS. 1 and 2, with a housing panel removed.
Figure 4:
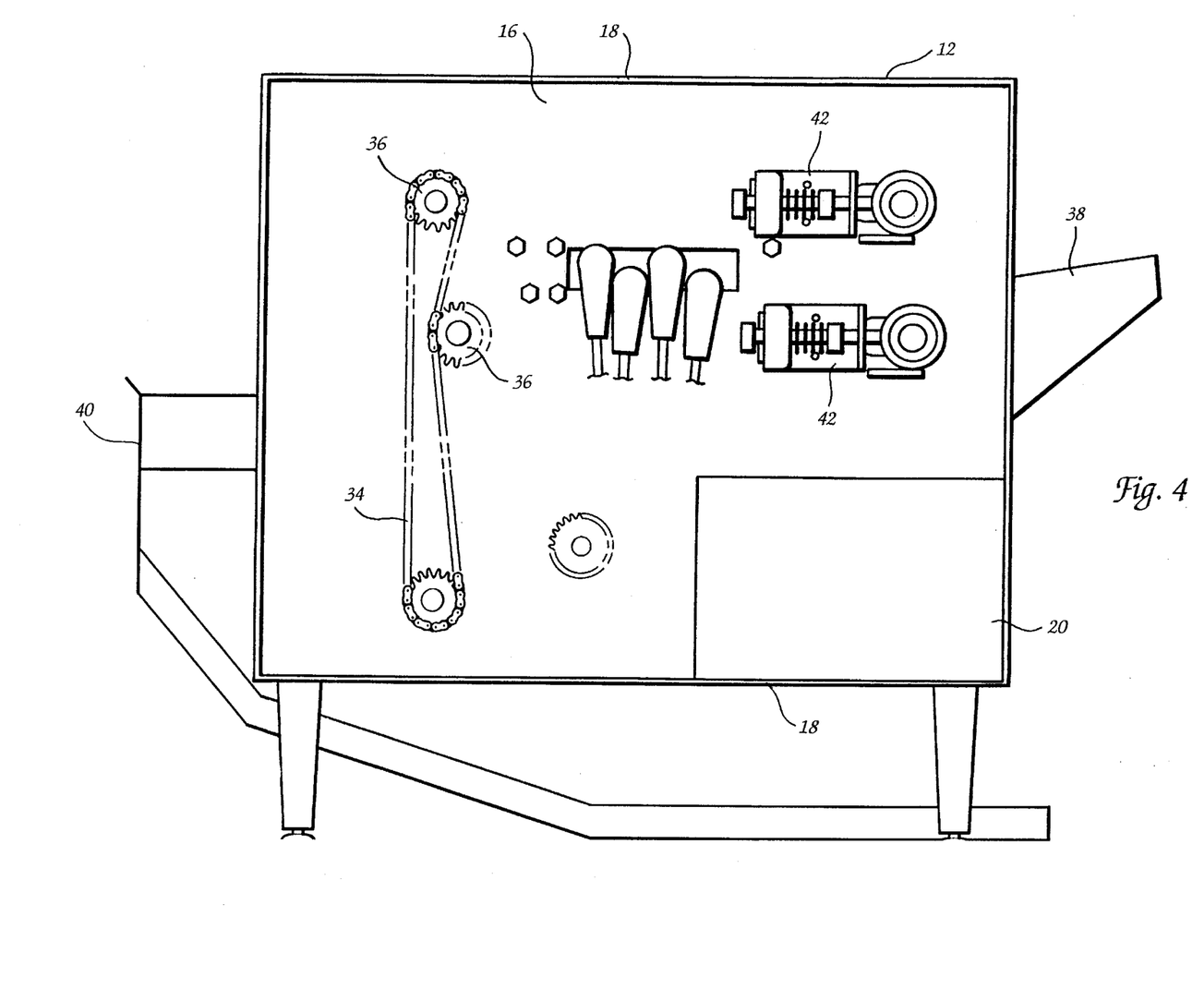
FIG. 4 is a left side elevational view of the griddle apparatus of FIGS. 1 and 2, with a housing panel removed.

Those persons skilled in the art will recognize and understand that the belts 28 will still require periodic replacement. To facilitate exchange of worn belts with new replacement belts, the non-driven belt-supporting rollers 30 of the conveyor arrangement 26 are mounted at their opposite ends to the opposed vertical frame plates 16 by means of releasable support brackets 42, best seen in FIGS. 3 and 4. Access to the brackets 42 is readily obtained by removal of a covering side panel 22, as is represented in FIG. 3 to have already been accomplished. FIG. 3 illustrates the right-hand side of the apparatus 10 opposite the drive arrangement of the drive motor 32 and drive chain 34 (shown in FIG. 4). As will be understood, it will be desirable to perform a belt exchange operation from the non-driven ends of the rollers 30 and, in accordance with the present invention, the belts 28 can be removed and new belts installed completely from the right-hand side of the apparatus 10 shown in FIG. 3 without requiring access to the opposite ends of the beltsupporting rollers 30 at the driven left-hand side of the apparatus 10.

Each opposite end of each belt-supporting roller 30 is rotationally mounted within a bearing assembly 44. At the right-hand side of the apparatus 10, the bearing assemblies 44 for each pair of rollers 30 are supported on a common elongate roller support plate 46, with the bearing assembly 44 for the rearward driven roller 30 being fixedly mounted to the plate 46 while the bearing assembly 44 for the forward non-driven roller 30 is slidably disposed within a lengthwise slot 48 in the plate 46. One of the aforementioned releasable brackets 42 is fixed to each bearing assembly 44 for the forward non-driven rollers 30 by means of a mounting bolt 50 about which a biasing spring 52 is disposed to urge the bracket 42 and the bearing assembly 44 away from one another. Each bracket 42 includes a projecting foot 54 which can be selectively placed in a receiving slot 56 in the associated roller support plate 46 to rigidly secure the bracket 42 and, in turn, the bearing assembly 44 and its associated roller 30 in fixed disposition relative to the roller support plate 46. Alternatively, the foot 54 of the bracket 42 can be withdrawn from the slot 56 to release the bracket 42, the associated bearing assembly 44 and the associated beltsupporting roller 30 from a rigid relationship with the roller support plate 46, thereby permitting the bearing assembly 44 to be slidably moved rearwardly within the slot 48. Each roller support plate 46 further includes a pair of projecting pins 58 which extend outwardly through support holes 60 in removable frame plates 62 mounted to the right-hand upright frame plate 16 by wing nuts 64. In FIG. 3, one such frame plate 62 is shown to have been removed for illustration purposes and particularly for better depicting the associated roller support plate 46.

The operation of replacing worn conveyor belts 28 may thus be understood. In normal operation, the removable frame plates 62 are secured rigidly to the upright frame plate 16 at the right-hand side of the apparatus 10 by the wing nuts 64 and, in turn, the pins 58 on the respective roller support plates 46 extend through the holes 60 in the removable frame plates 62 to rigidly support the roller support plates 46 and the associated rollers 30 and conveyor belts 28. With the respective feet 54 of the brackets 42 situated in the retaining slots 56, the biasing springs 52 urge the respective bearing assemblies 44 forwardly so as to maintain appropriate tension in the conveyor belts 28 for normal conveyance of food in ongoing cooking operation. Upon stoppage of the apparatus 10, the belts 28 are easily removed by releasing the wing nuts 64 to remove the frame plates 62, thereby exposing each roller support plate 46. Upon release of the brackets 42 from the foot-retaining slots 56, the spring-biasing force on each non-driven roller 30 is released, permitting the associated bearing assemblies 44 to move rearwardly within the supporting slots 48 sufficiently to relax tension in the belts 28, whereby each belt can be withdrawn laterally over the associated roller support plate 46. Likewise, a replacement belt can be easily installed over each roller support plate 46, whereupon the brackets 42 are returned to their tensioning position in the retaining slots 56 and the frame plates 62 are reinstalled. Such operation can be easily accomplished in a matter of minutes, thereby minimizing down time in the on-going cooking operation of the apparatus 10.

Figure 5:
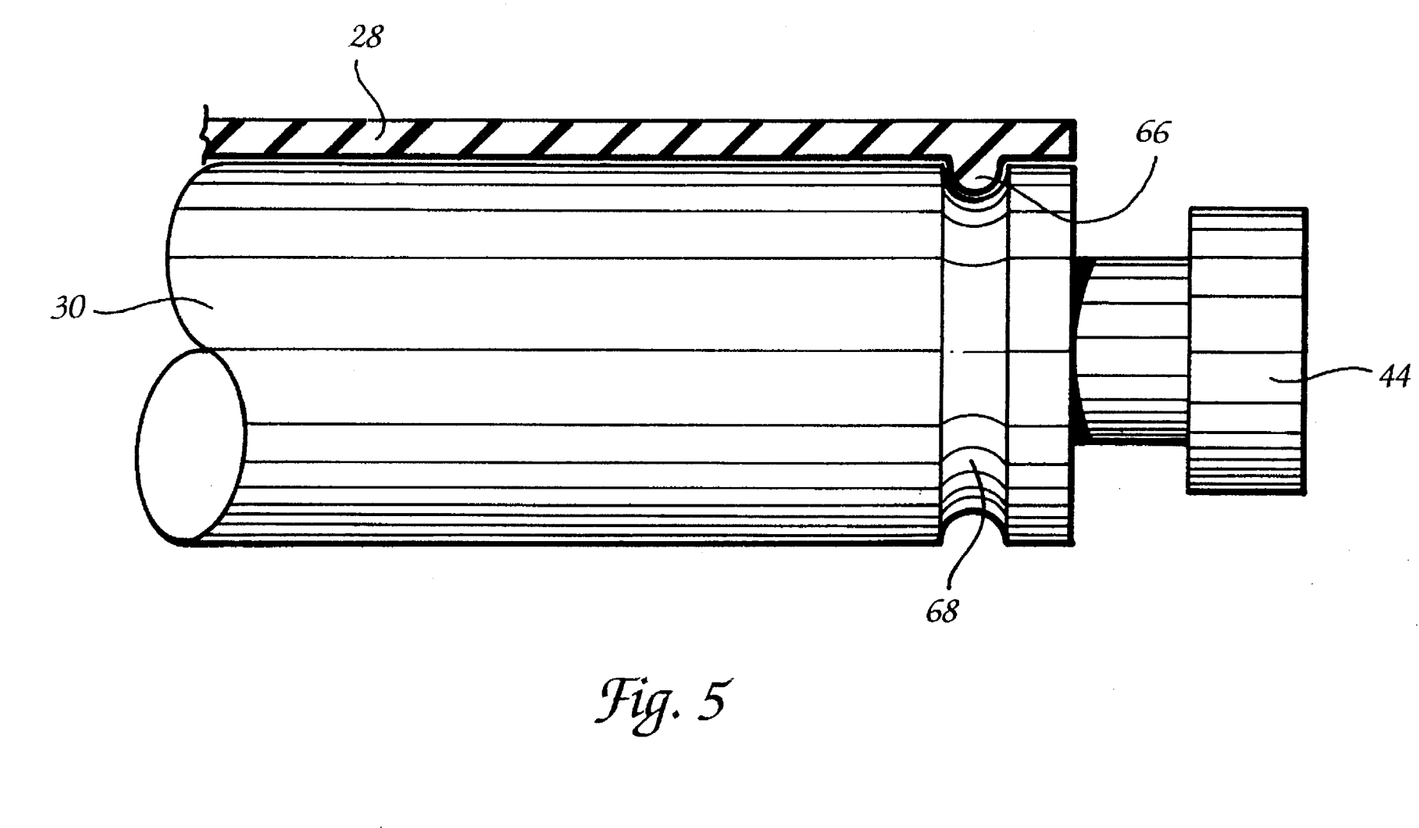
FIG. 5 is an elevational view, partially in cross-section, of one conveyor roller and its associated belt in the apparatus of FIGS. 1 and 2.

In order to ensure that each conveyor belt 28 is maintained in a proper tracking relationship to its supporting rollers 30 against undesirable lateral movement relative to the rollers, each conveyor belt 28 is formed with an inwardly protruding endless rib 66 extending lengthwise along one side edge of the belt 28 and each belt-supporting roller 30 is correspondingly formed with an annular recess 68 to receive the rib 66, all as shown in FIG. 5. In this manner, each belt 28 is securely maintained in a desired disposition centered along the length of its associated supporting rollers 30, thereby also to maintain proper food-transporting relationship between the two belts 28.

As an alternative to the above-described mechanical arrangement utilizing the system of brackets 42 to facilitate periodic replacement of the conveyor belts 28, it is contemplated that the belt supporting rollers 30 may be mounted in a cantilevered fashion, e.g., with only the respective ends of the rollers 30 at the left-hand side of the apparatus 10 being mounted to the upright frame plate 16. By arranging the rollers 30 in such a cantilevered fashion so as not to exert substantial tension in the conveyor belts 28, the conveyor belts 28 could be easily removed from the opposite cantilevered end of the rollers 30. In such embodiment, the reduced level of tension in the belts 28 could potentially result in belt slippage and, accordingly, it would be desirable to provide an auxiliary roller in the nature of a follower or pinch roller adjacent the driven roller of each pair of rollers 30 in order to maintain proper frictional contact between each driven roller and its associated conveyor belt and also to maintain proper engagement of the belt rib 66 in the recess 68 of the associated roller.

As those persons skilled in the an will therefore readily recognize and understand, the apparatus 10 advantageously performs on an automated on-going basis substantially the identical type of cooking operation performed by conventional "clamshell" style griddles. However, in substantial contrast to the disadvantages of conventional griddles, the apparatus 10 is capable of substantially higher production rates so as to better accommodate peaks in restaurant customer demands. At the same time, the apparatus of the present invention eliminates the need for close monitoring of the griddle-cooking process by a skilled or trained attendant and avoids the accompanying variances which necessarily occur in cooking quality.

It is contemplated that the apparatus of the present invention may be utilized for cooking a wide variety of differing food products. Various adjustments are possible to accommodate the apparatus to different cooking requirements, including, for example, adjustment of electrical power to the cooking elements 24 to vary cooking temperature and variable operation of the drive motor 32 to adjust the traveling speed of the conveyor belts 28. A degree of adjustment in the spacing between the conveyor belts 28 is also possible by means of a slotted configuration of the mounting openings in the removable frame plates 62 (see FIG. 3). Thus, by way of example, the apparatus 10 could potentially be utilized for grilling such diverse food products as Mexican quesadillas, other more traditional forms of sandwiches, hamburgers, bacon, etc. As to food products such as hamburgers, bacon and the like which tend to render fat, grease and other juices, it would probably be desirable to reconfigure the apparatus, e.g., to provide for inclined or possibly even vertical orientation of the belts, to accommodate drainage of such renderings.

FIGS. 6–10 illustrate one such alternative embodiment of the present apparatus, indicated generally at 110, wherein the conveyor belts are oriented to travel at a slight downward incline for such drainage purposes, whereby the apparatus 110 would be particularly suitable for cooking hamburgers and the like. In the apparatus 110, each conveyor belt 128 and its associated supporting rollers 130 are fixedly mounted between a pair of side rails 135, which also support a respective one of the cooking elements 124 between the two runs of the associated conveyor belt 128, thereby forming two discrete conveyor/heater units which advantageously can be removably mounted within the frame 112 of the apparatus 110.

Figure 6:
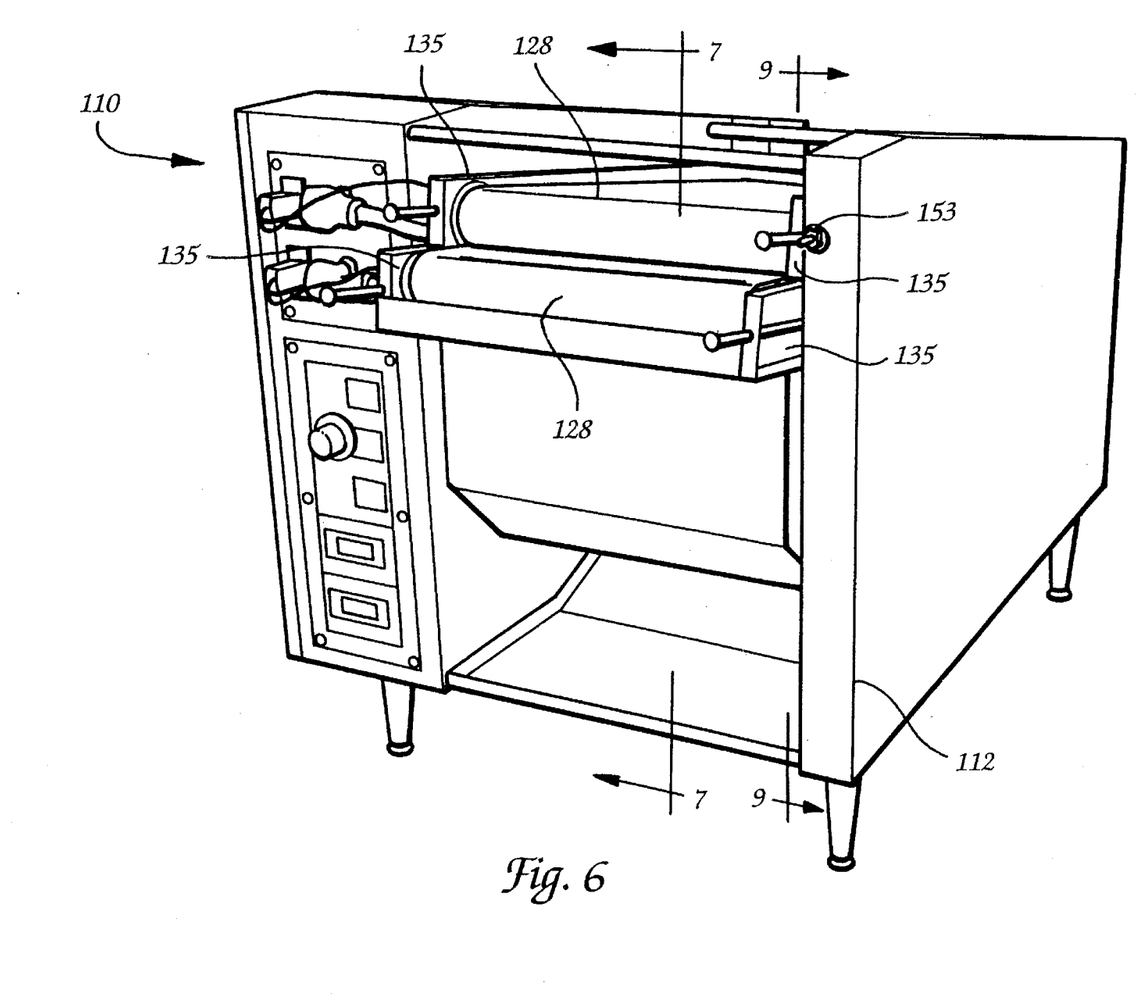
FIG. 6 is a perspective view of another conveyorized griddle apparatus, according to a second embodiment of the present invention.

Specifically, a pair of supporting angle brackets 125 are mounted to the inward faces of the upright frame plates 116 of the apparatus 110 to project inwardly toward one another and to extend along the frame plates 116 from their forward to their rearward sides at the downward angle desired for the conveyor belts 128. The lower conveyor/heater unit is slidably inserted into the apparatus 110 between the upright frame plates 116 to rest by its side rails 135 respectively on the angle brackets 125 and, similarly, the upper conveyor/ heater unit is slidably inserted into the apparatus 110 to rest by its side rails 135 on the respective side rails 135 of the lower conveyor/ heater unit. As seen in FIG. 6, each conveyor/heater unit has appropriate electrical lead cords extending therefrom to be connected through suitable plug-type connections at the forward end of the apparatus frame 112 for connection with the control unit and electrical supply unit for the apparatus 110, thereby to provide an electrical power supply to the respective cooking elements 124.

Figure 7:
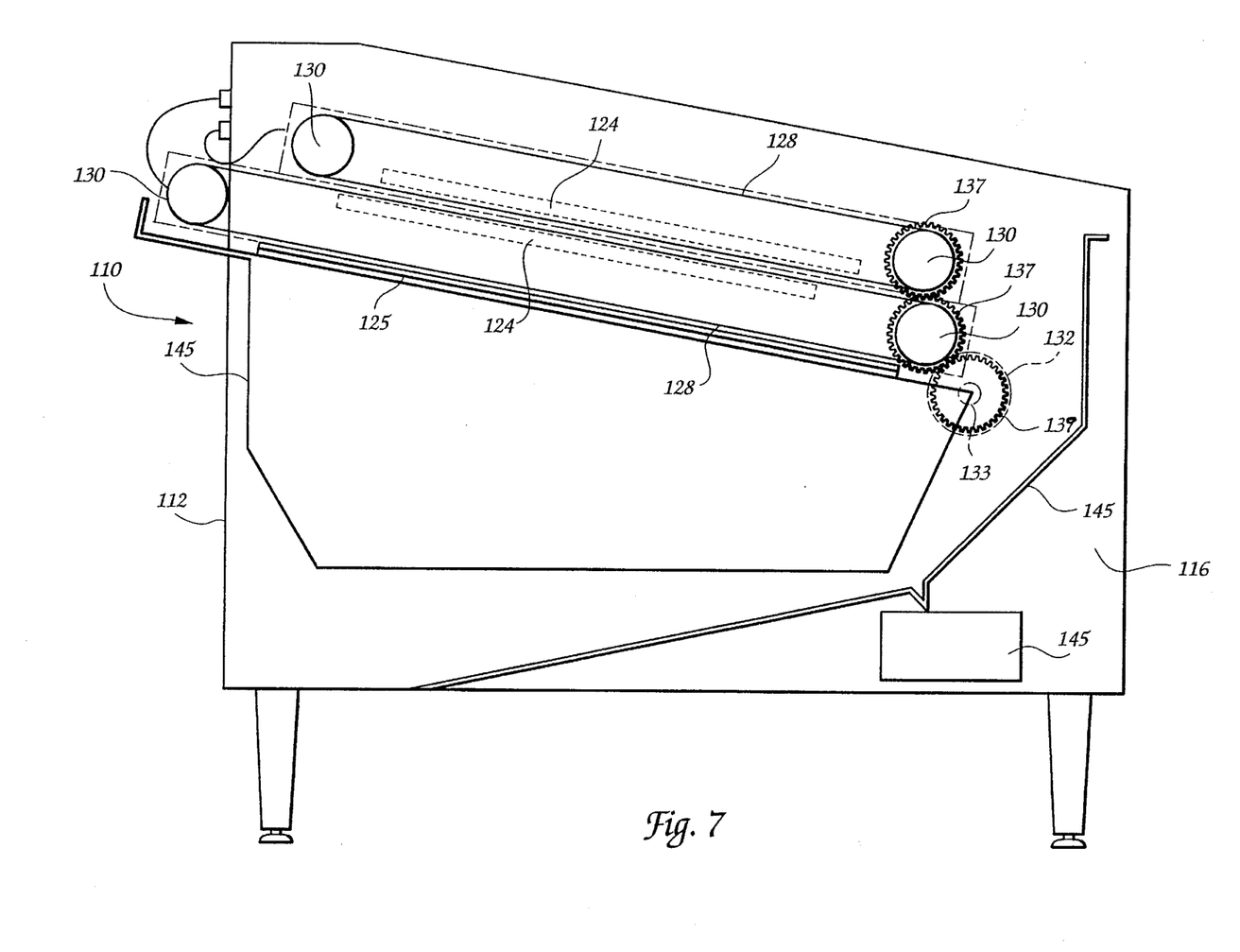
FIG. 7 is a lengthwise vertical cross-sectional view taken through the griddle apparatus of FIG. 6 along line 7-7 thereof.

As best seen in FIG. 7, the rearward roller 130 of each conveyor/heater unit has a drive gear 137 affixed to one end. The drive motor 132 of the apparatus 110 is mounted within the frame 112 with its drive shaft 133 projecting through one upright frame plate 116 and has a driving gear 139 fixed to the projecting end of the drive shaft 133. In the installed disposition of the lower conveyor/heater unit, the drive gear 137 of its rearward belt-supporting roller 130 rests in meshing driven engagement with the driving gear 139 of the drive motor 132 and, similarly, in the installed disposition of the upper conveyor/heater unit, the drive gear 137 of its beltsupporting roller 130 rests in meshing engagement with the drive gear 137 of the lower unit. In this manner, the conveyor belts 128 are advantageously driven in opposite directions to cause their operative facing runs to travel in a common food-transporting direction. As also seen in FIG. 7, the apparatus 110 includes appropriate drainage collection pans 145 situated beneath the rearward ends of the conveyor units to receive and collect renderings from food products being cooked.

Figure 8:
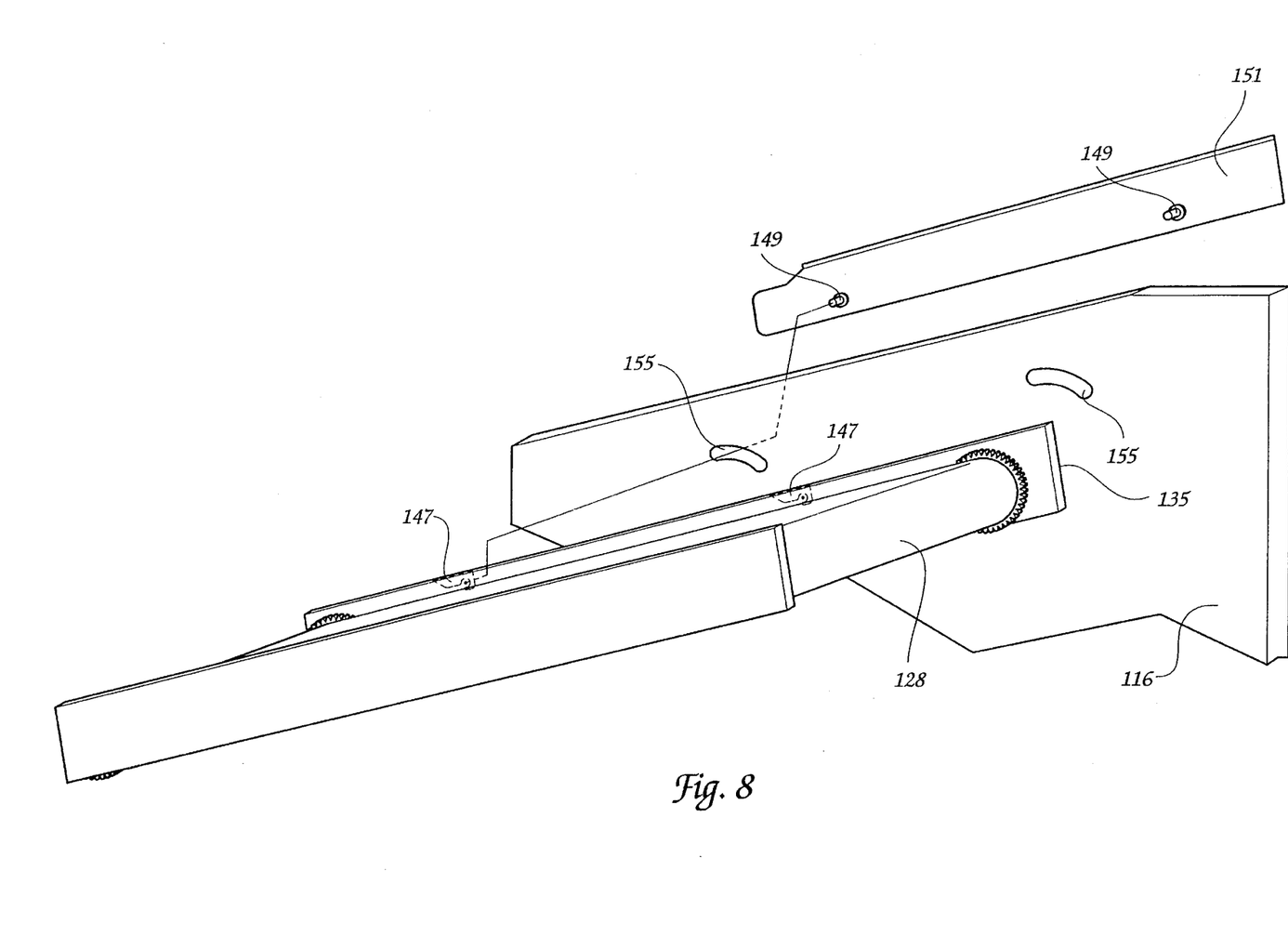
FIG. 8 is a partial exploded view of the griddle apparatus of FIGS. 6 and 7.
Figure 9:
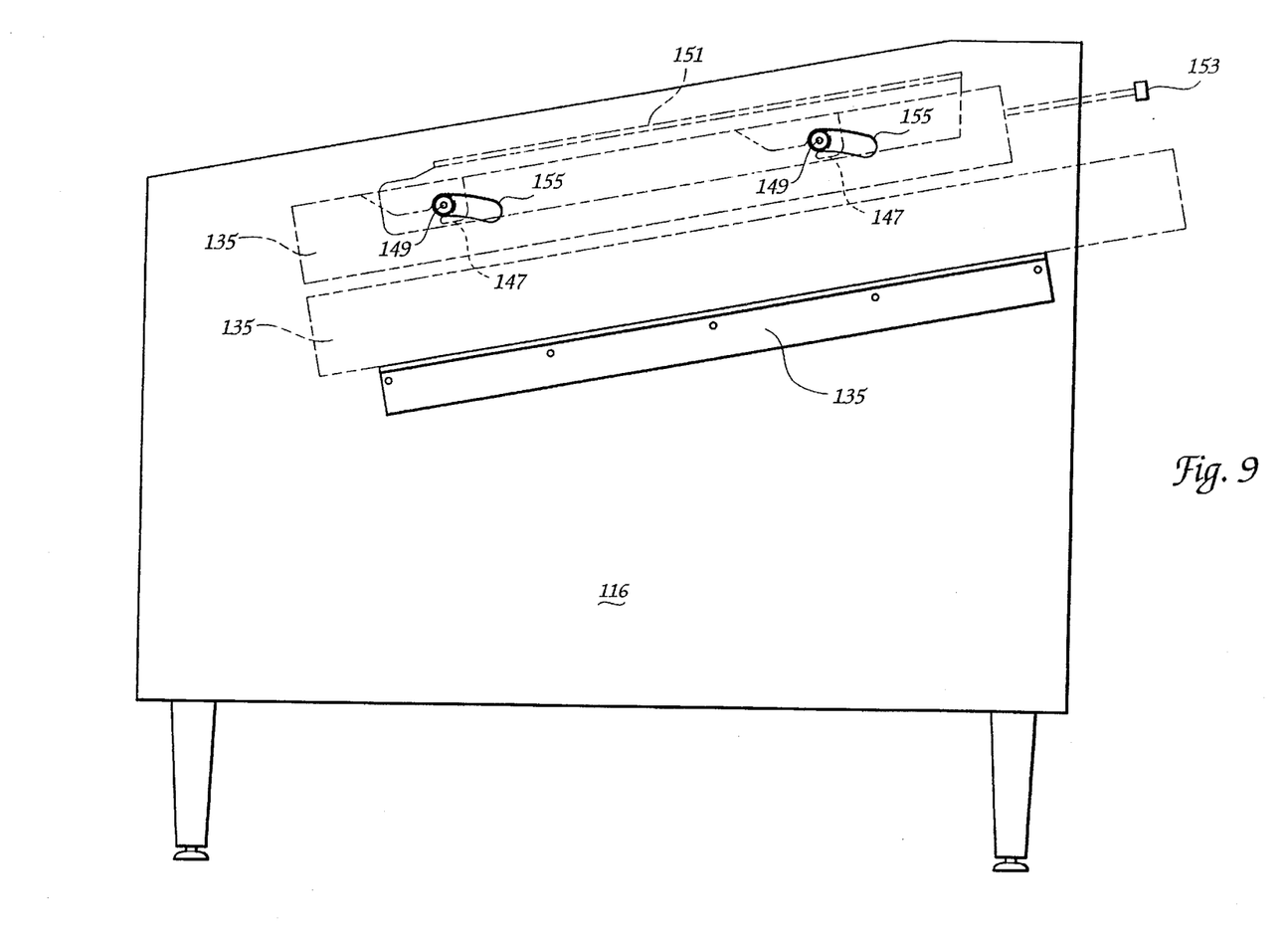
FIG. 9 is another vertical cross-sectional view of the griddle apparatus of FIG. 6, taken along line 9-9 thereof.
Figure 10:
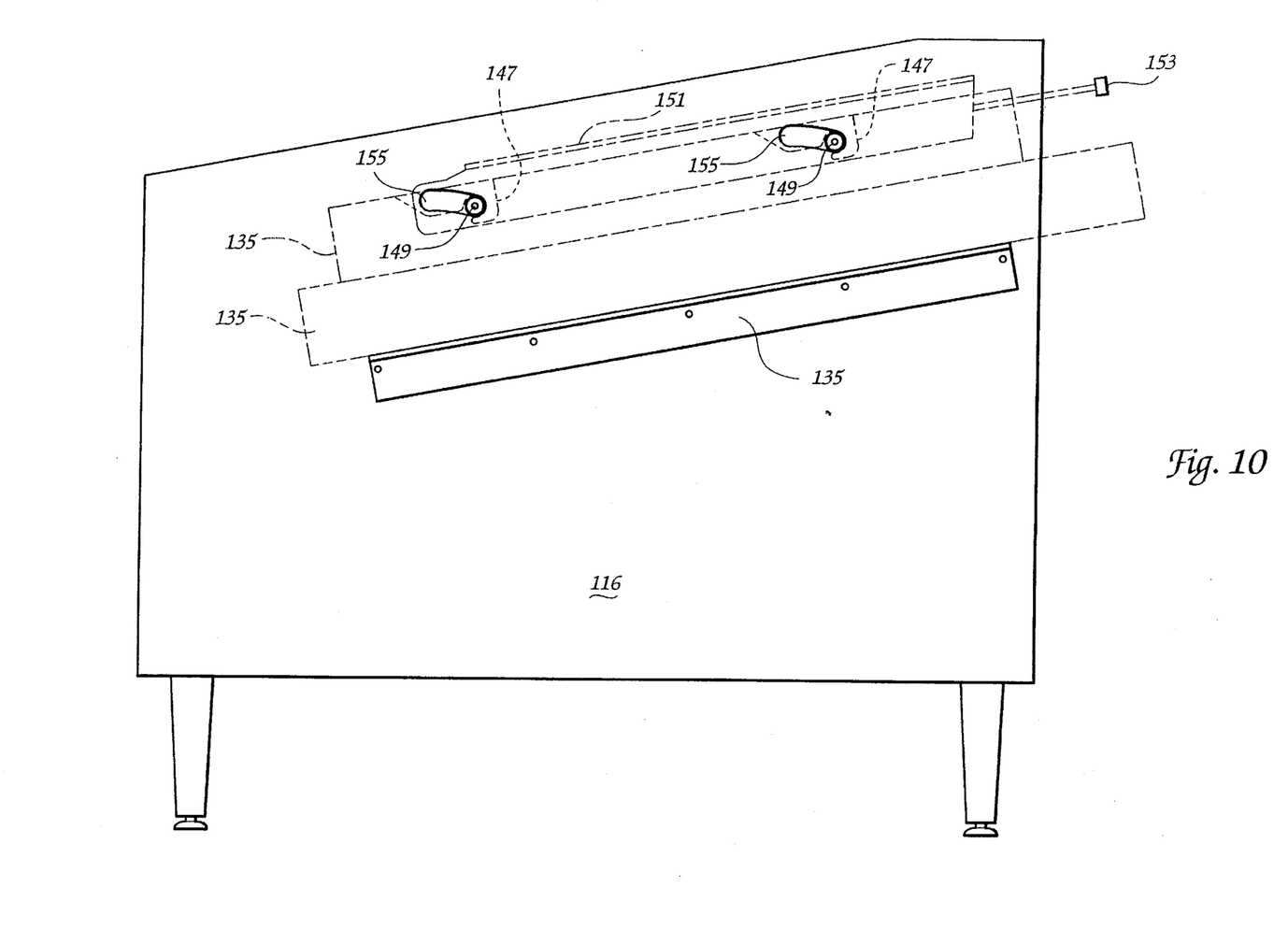
FIG. 10 is another cross-sectional view similar to FIG. 8 but showing the upper conveyor unit of the griddle apparatus in a moved position.

As best seen in FIGS. 8-10, the apparatus 110 is provided with a novel arrangement permitting selective adjustment of the spacing between the two conveyor/heater units. Specifically, the side rails 135 of the upper conveyor/heater unit include hook-shaped hanger brackets 147 which engage in the installed disposition of the unit with compatibly sized pins 149 projecting inwardly from the upright frame plates 116. The pins 149 are affixed to slide plates 151 slidably mounted to the outward surface of each upright frame plate 116, the pins 149 projecting through respective arcuate slots 155 formed in the frame plates 116. An actuating arm 153 is affixed to each slide plate 151 to extend forwardly therefrom through the front side of the apparatus 110 to permit sliding manipulation of the slide plates 151 by an operator. As will be understood, manipulation of each slide plate 151 between the opposite ends of the arcuate slots 155 determines a selective degree of raising and lowering of the elevation of the slide plates 151, thereby in turn raising and lowering the associated upper conveyor/heater unit by engagement of the pins 149 in the hanger brackets 147, as depicted in fully raised disposition in FIG. 9 and fully lowered disposition in FIG. 10. Such adjustment advantageously permits the apparatus 110 to accommodate food products of differing thicknesses, whereby the same apparatus can potentially be used for griddle-cooking of relatively thin food products such as bacon or relatively thicker food products such as hamburgers.

Of course, persons skilled in the art will readily recognize that many possible variations of the griddle apparatus of the present invention are possible. For example, in the embodiment of FIGS. 6-10, the upwardly facing side of the apparatus 110 could be left uncovered by any frame panel, thereby leaving the upper run of the upper conveyor 128 exposed. It would then be possible for attendants to load food products into the apparatus by placing the products directly onto the upper run of the upper conveyor. Because the lower conveyor 128 extends slightly more forwardly from the apparatus 110 than the upper conveyor, food products would then follow the upper conveyor onto the lower conveyor and progress into the cooking area between the two conveyors. With some food products, sufficient cohesion may exist between the food product and the upper conveyor belt to enable the food product to follow the contour of the forward roller 130 of the upper belt, whereby it would not be necessary for the lower conveyor to project more forwardly than the upper conveyor, in which case the upper and lower conveyor/heater units could potentially be made of the identical length.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. Apparatus for conveyorized heating of a food product simultaneously on two opposed sides, the apparatus comprising a pair of heating elements arranged in opposed spaced facing relation for emitting thermal energy toward one another, two endless food transport conveyors each having a substantially continuous imperforate food contacting surface, and means for driving the conveyors to travel between the heating elements along respective food-conveying runs in a common transport direction in sufficiently closely spaced, generally parallel relation to transport the food product to be heated between the conveyors and between the cooking elements by contact of the respective food contacting surfaces of the conveyors with opposite sides of the food product, the drive means comprising a pair of rollers supporting each conveyor and a drive motor connected in synchronous driving relation to one roller of each pair.

2. Apparatus for conveyorized heating of a food product according to claim 1, wherein each of the conveyors comprise an endless belt.

3. Apparatus for conveyorized heating of a food product according to claim 2, wherein each belt comprises a substrate web coated with a polymeric outer layer to form the continuous imperforate food contacting surface.

4. Apparatus for conveyorized heating of a food product according to claim 1, wherein the drive means comprises an endless drive chain connecting the drive motor with the one roller of each pair.

5. Apparatus for conveyorized heating of a food product according to claim 1, wherein a drive gear is fixed to the one roller of each pair, the respective drive gears being in meshing engagement with one another and one of the drive gears being in meshing engagement with a driving gear attached to the drive motor.

6. Apparatus for conveyorized heating of a food product according to claim 1, wherein the other roller of each pair is mounted to be selectively movable toward and away from the respective one roller of each pair for exchanging the respective conveyor.

7. Apparatus for conveyorized heating of a food product according to claim 1, wherein each conveyor and its associated rollers are slidably removable as a unit from the apparatus.

8. Apparatus for conveyorized heating of a food product according to claim 1, wherein each conveyor includes an endless tracking rib extending along the length of the conveyor and at least one of the associated rollers includes an annular groove receiving the rib for maintaining the conveyor in a predetermined relative alignment with the rollers.

9. Apparatus of a food product according to claim 1 and further comprising means for selectively adjusting the spacing between the food-conveying runs of the conveyors.

10. Apparatus for conveyorized heating of a food product according to claim 1, wherein each heating element comprises a planar electrical heating element.

11. Apparatus for conveyorized heating of a food product according to claim 1, wherein the food-conveying runs of the conveyors are substantially horizontal.

12. Apparatus for conveyorized heating of a food product according to claim 1, wherein the food-conveying runs of the conveyors are inclined from the horizontal sufficiently for drainage of any liquids rendered from the food product.

* * * * *

UNITED STATES PATENT AND TRADEMARK OFFICE
CERTIFICATE OF CORRECTION

PATENT NO. : 5,588,354
DATED : December 31, 1996
INVENTOR(S) : Robert M. Stuck et al It is certified that error appears in the above-identified patent and that said Letters Patent is hereby corrected as shown below:

Column 3, line 28, delete "thereof," and insert therefor --thereof;--.

Column 4, line 49, delete "foodcontacting" and insert therefor --food-contacting--.

Column 5, line 21, delete "(.shown" and insert therefor --(shown--

Column 5, line 27, delete "beltsupporting" and insert therefor --belt-supporting--.

Column 5, line 50, delete "beltsupporting" and insert therefor --belt-supporting--.

Column 6, line 53, delete "an" and insert therefor --art--.

Column 7, line 43, delete "conveyor/ heater" and insert therefor --conveyor/heater--.

Column 7, line 61, delete "beltsupporting" and insert therefor --belt-supporting--.

Column 10, line 21, after "Apparatus" insert --for conveyorized heating--.

Signed and Sealed this

Twenty-eighth Day of July, 1998

Attest:

BRUCE LEHMAN

*Attesting Officer*   *Commissioner of Patents and Trademarks*